C. S. MOORE.
MILKING PAIL.
APPLICATION FILED MAR. 12, 1913.
1,066,135.
Patented July 1, 1913.
2 SHEETS—SHEET 1.
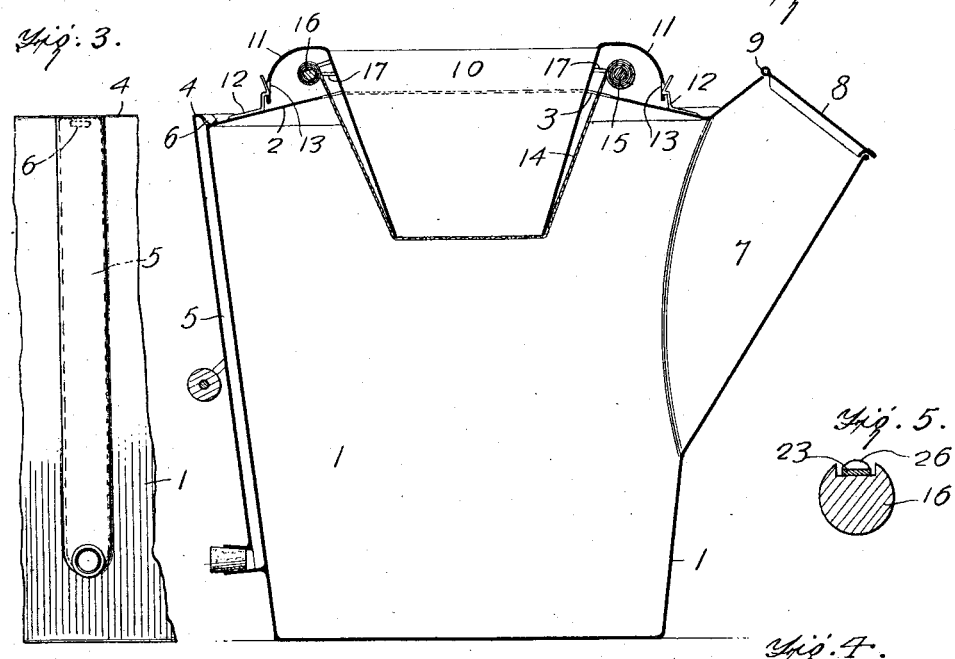
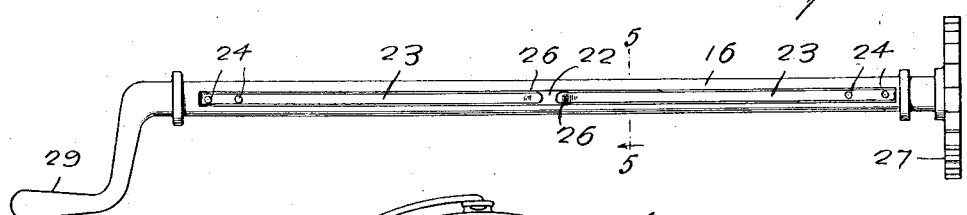
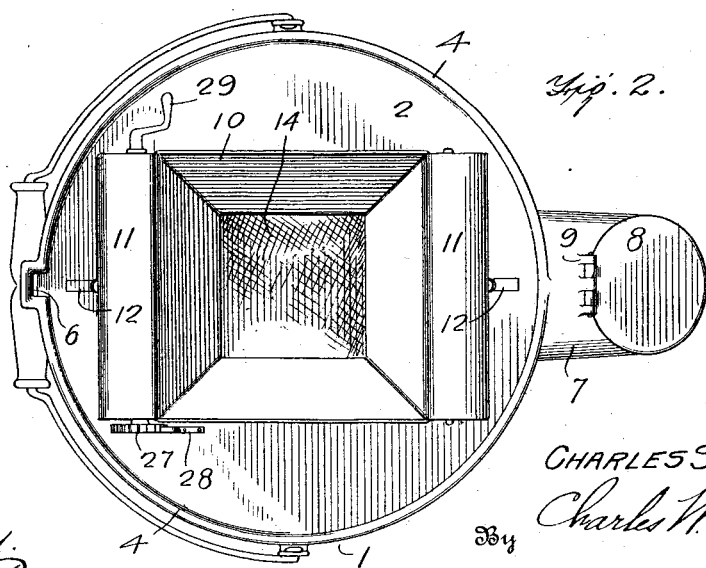
Witnesses
Inventor
CHARLES S. MOORE
By Charles W. Lovett
Attorney C. S. MOORE.
MILKING PAIL.
APPLICATION FILED MAR. 12, 1913.
1,066,135.
Patented July 1, 1913.
2 SHEETS—SHEET 2.
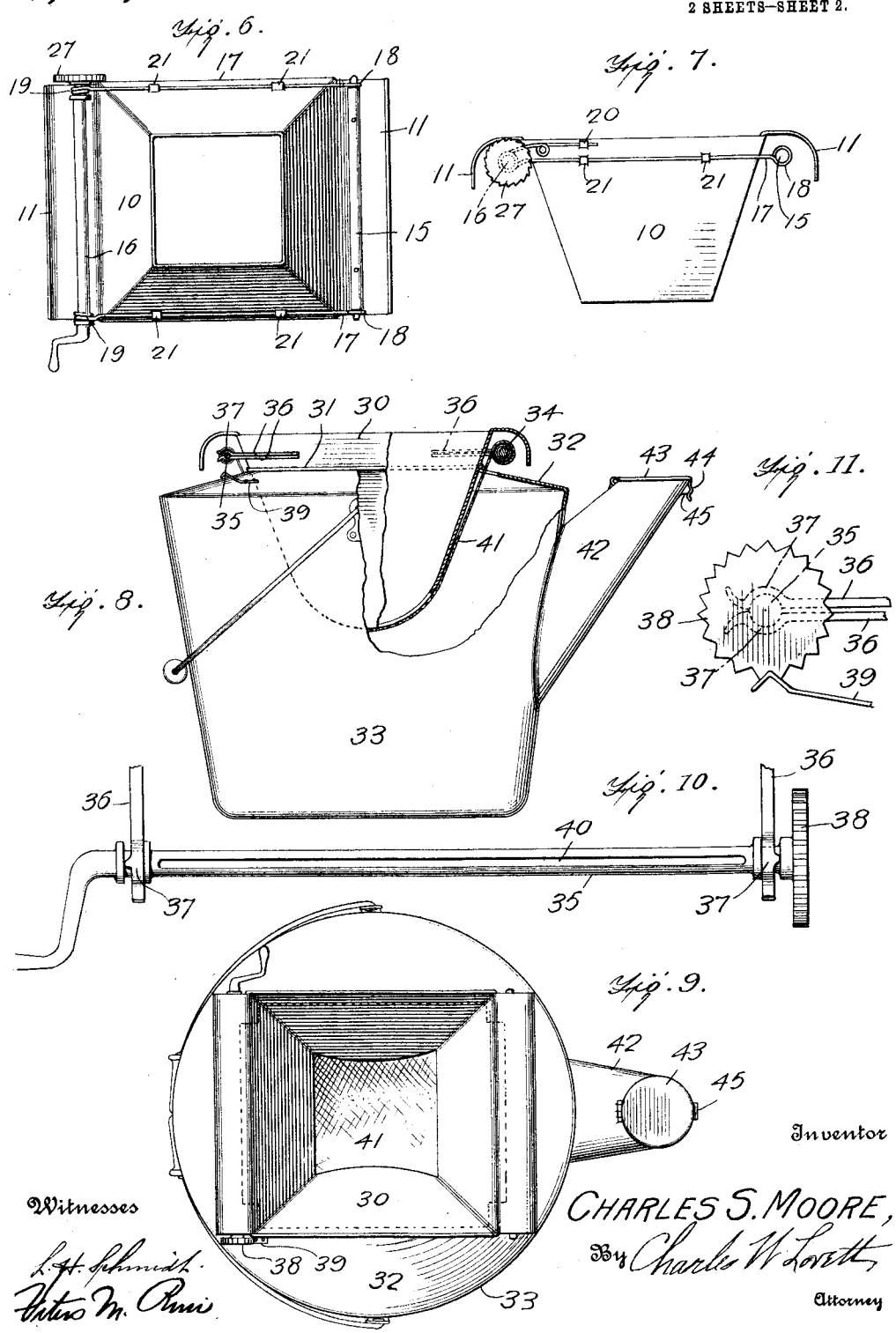
Witnesses
Inventor
CHARLES S. MOORE,
By Charles W. Lovett
Attorney

UNITED STATES PATENT OFFICE.

CHARLES S. MOORE, OF DANVERS, MASSACHUSETTS.

MILKING-PAIL.

1,066,135.　　　　Specification of Letters Patent.　　Patented July 1, 1913.

Application filed March 12, 1913. Serial No. 753,782.

*To all whom it may concern:*

Be it known that I, CHARLES S. MOORE, a citizen of the United States, residing at Danvers, in the county of Essex and State of Massachusetts, have invented certain new and useful Improvements in Milking-Pails, of which the following is a specification.

The objects, *inter alia*, of this invention are as follows: 1. To provide a milking-pail of such construction that the milk entering the same shall be strained; and, to this end, I employ a flexible straining-member, specifically, by preference, a reel of cloth suitably carried, as upon rollers, and operable to bring a clean and unused area or section thereof into position for straining, each time milk is deposited in the pail. 2. To provide a pail which shall be sanitary in use; and, to this end, I provide means for maintaining the exterior sides of the pail dry and clean, so that they may not soil the clothing of the operator, or other surface with which they may come into contact. 3. To provide improved spring means for detachably holding in operative position the funnel through which the milk enters the pail. 4. To provide an improved form of funnel equipped with means for protecting or covering the rollers upon which the straining-cloth is wound. 5. To provide an automatically-closing, gravity-controlled cover or lid for the pouring- or exit-spout of my pail. 6. To provide improved spring means for initially retaining the strainer-cloth on one or both of the rollers. 7. To provide a milking-pail which shall be comparatively simple of construction and relatively inexpensive to manufacture, and which may be durable in use and thoroughly efficient for the purposes intended.

With these objects in view, the invention resides in the novel construction, combination and arrangement of parts of a milking-pail as will be described more fully in the following specifications, as illustrated in the drawings, and as pointed out and summed up in the claims appended hereto.

The invention is graphically illustrated in the accompanying drawings, in which like reference-characters denote corresponding parts throughout the several views.

In the drawings, forms of embodiment of my invention, susceptible of carrying out the underlying principles thereof, are disclosed, as illustratory examples, and in said drawings; Figure I is a central, vertical, longitudinal section through my improved pail; Fig. II is a top plan view thereof; Fig. III is a fragmentary detail view, in side elevation, of the pail, showing the draining-canal or pipe; Fig. IV is a detached, detail view of the ratchet-carrying roller on which the strainer-cloth is wound; Fig. V is a cross section on the line 5—5, of Fig. IV; Fig. VI is a detached bottom plan view of the funnel, the rollers on which the strainer-cloth is wound, and the wire-spring supports or bearings for the rollers; Fig. VII is a detached detail view, in side elevation, of the funnel; Fig. VIII is a view, in side elevation, partly broken away, of a pail embodying slightly modified structural features; Fig. IX is a top plan view of the pail of Fig. VIII; Fig. X is a detached detail view of one of the rollers of the pail shown in Fig. VIII; Fig. XI is a fragmentary detail view of the form of ratchet and wire-spring bearings used with the pail shown in Fig. VIII.

Referring, now, in detail to the drawings, and, first, to Figs. I to VII thereof: 1 designates, in general, my pail, provided with a sloping or inclined top 2, having a central aperture 3. The pail, at the top thereof, is provided with a circumferential, upward-projecting bead or flange 4, toward which the top 2 slopes from the point of the aperture 3. Extending down the side of the pail is a drain-pipe 5, provided, at its top, with an opening 6. It will be seen, by this construction, that all drippings or overflow are caused to run down the sloping pail-top 2, are prevented, by the bead 4, from escaping down the exterior sides of the pail, and are drained off by means of the pipe 5, through the aperture 6 in the top thereof. By this construction, I secure a clean and sanitary exterior surface of the sides of my pail, and thus the clothing of the operator, or other surface, is not contaminated. The pail 1 is also provided with a spout 7, provided with a downward-inclined, open top, that is, a top inclined at an angle to the plane of the bottom of the pail. The open top of the spout 7 is normally closed by a lid, cap or cover 8, which is hinged, at the highest point of the inclined top of the spout, as shown at 9, whereby, when the pail is tilted to pour milk therefrom, through the spout 7, the lid or cap 8 will swing open automatically, and, as the pail assumes its normal position, said lid will close automatically, by gravity. Through the aperture 3 in the top 2 of the pail normally projects a funnel 10, provided, of course, with an open top and bottom. The top of the funnel is provided, at diametrically opposite points, with two aprons 11, 11, extending in a direction away from the funnel, said aprons being curved or inclined downward, in cross section, as shown clearly in the drawings. The aprons are normally retained, against accidental removal from the pail, by suitable and appropriate means, in this instance, spring-catches 12, 12 carried by the pail-top 2 and engaging the walls of apertures 13, 13 in said aprons. When it is desired to remove the funnel 10 from the pail, the catches 12, 12 are sprung, by the fingers of the operator, out of engagement with the aprons, when the funnel may be quickly removed. In disposing the funnel in the pail, it will be noted that the catches 12, 12 spring automatically into engagement with the apertures 13, 13, to lock the funnel in position, when the funnel shall have been pushed far enough down into the pail 1.

Suitable means for straining the milk, as it enters the pail 1, are comprehended by my invention, and, in this instance, such means comprise a flexible straining-member, desirably a cloth 14, which is suitably supported so as to be moved, as desired, beneath the open bottom of the funnel 10, to present successive areas of such cloth beneath, or in line with, the said open bottom of the funnel. My invention also contemplates suitable means for effecting travel of the cloth, as described. In this instance, such supporting and operating means for the strainer-cloth comprise the following instrumentalities: The strainer-cloth 14 is wound upon rollers 15, 16, which are preferably disposed, as shown, beneath the aprons 11, 11, so as to be screened or protected thereby. The rollers are suitably supported, in this instance, very advantageously, by companion or complemental wire-springs 17, 17, each of which is provided, at one end thereof, with a coil or loop 18 (see Figs. VI and VII) encircling the roller 15, and with another coil 19 encircling the roller 16, the other end of the wire spring engaging a catch 20 (of any suitable construction) on the funnel 10. The springs 17, 17 may either be secured to the top 2 of the pail, or to the funnel 10,—in this instance, they are shown secured to the funnel by means of eyes 21, 21, or the like, through which the springs extend. One or both of the rollers 15, 16 (in this instance, the roller 16) may be provided with a longitudinally-extending groove 22, in which are disposed spring means (in this instance, leaf-springs 23, 23), each spring being secured, at one end thereof, in any suitable manner, as by rivets 24, to the roller. Desirably, the proximate ends of the leaf-springs 23, 23 are bent upward away from the roller 16, as shown at 26, 26, these upward-bent ends affording a convenient finger-hold for the operator in flexing the springs outward to permit the end of the strainer-cloth being passed between said springs and the roller 16. Now, it will be seen that, in assembling the parts of my device, the strainer-cloth 14 is passed under the open bottom of the funnel 10, and the end of the cloth is passed under the leaf-springs 23, 23, which clamp or bind the cloth on the roller 16, whereby the strainer-cloth is initially retained on the roller before being wound thereon. The funnel 10 presses, at its bottom, against the screening or straining cloth 14, insuring a taut surface of the cloth between its points of contact with the funnel-bottom. One end of the roller 16 is provided with a ratchet-wheel 27, engaged by a spring-pressed or spring pawl 28, which holds the roller after the latter has been rotated and prevents retrograde movement thereof. The roller 16 is conveniently provided, at the other end, with a crank 29, by which it may be rotated.

Referring, now, to the modified form of pail shown in Figs. VIII et seq.: the funnel 30 is provided, at a suitable point below its top, with a circumferential bead 31, which rests on the inclined top 32 of the pail 33 when the funnel is in normal position in the pail. By means of this bead 31, the funnel is evenly supported in position. The spring bearings for each of the rollers 34, 35 comprise two superposed wire springs 36, 36, the springs being provided, at one end thereof, with complemental arc-shaped portions 37, 37 encircling one of the rollers 34, 35, and constituting the bearing proper therefor. The roller 35 carries, at one end thereof, a two-way ratchet-wheel 38, engaged by a spring-pressed, or spring, pawl 39 secured to the inclined top 32. The roller 35 is provided with a longitudinally-extending slot 40, through which the end of the strainer-cloth 41 is passed or threaded, in the manner of a thread in the eye of a needle. The spout 42 is provided with a hinged cover 43, carrying a spring latch 44, which locks over a projection 45 on the spout, thus retaining the cover 43 against accidental opening.

The structural differences between the device of Figs. VIII et seq. and the device shown in Figs. I to VII have now been described. The remaining structural features shown in Figs. VIII et seq. and not herein specifically described are identical with like parts already described in connection with Figs. I to VII.

While I have described herein with great particularity two forms of my invention, I realize that other forms may be resorted to, and that various modifications in detail may be made; but all such changes as come within the scope of the appended claims constitute no departure from the spirit of the invention, and fall strictly within the scope and purview of the latter.

Having thus fully described my invention, what I claim as new and desire to secure by Letters Patent of the United States is:

1. In a milking-pail, having an opening in its top, a funnel suspended in said opening, a flexible screening-member movable beneath the open bottom of said funnel, and spring-supported rollers on which the said screening-member is wound.

2. In a milking-pail, having an opening in its top, a funnel suspended in said opening and carrying curved aprons extending in a direction away from said funnel, spring-supported rollers disposed beneath and protected by said aprons, and a flexible screening-member wound on said rollers and movable beneath the open bottom of said funnel.

3. In a milking-pail, having an inclined, apertured top, with an upward-projecting, circumferential bead at the outer edge thereof, a funnel suspended in said aperture, and a flexible screening-member movable beneath the open bottom of said funnel.

4. In a milking-pail, having an inclined, apertured top, with an upward-projecting, circumferential bead at the outer edge thereof, a drain-pipe extending down the side of the pail, a funnel suspended in said aperture, and a flexible screening-member movable beneath the open bottom of said funnel.

5. In a milking-pail, having an opening in its top, a funnel suspended in said opening and carrying curved aprons extending in a direction away from said funnel, spring means carried by the pail and engaging said aprons for retaining the funnel in position in the pail, rollers supported beneath and protected by said aprons, and a flexible screening-member wound on said rollers and movable beneath the open bottom of said funnel.

6. In a milking-pail, having an opening in its top, a funnel suspended in said opening and carrying curved, apertured aprons extending in a direction away from said funnel, spring means carried by and engaging the apertures in said aprons for retaining the funnel in position in the pail, rollers supported beneath and protected by said aprons, and a flexible screening-member wound on said rollers and movable beneath the open bottom of said funnel.

7. In a milking-pail, a flexible screening-member, rollers on which said screening-member is wound, and spring-retaining means carried by one of said rollers for holding said screening-member thereon.

8. In a milking-pail, a flexible screening-member, rollers on which said screening-member is wound, and leaf-springs carried by one of said rollers for holding said screening-member thereon.

9. In a milking-pail, a flexible screening-member, rollers on which said screening-member is wound, one of said rollers being longitudinally grooved, and spring-retaining means disposed in said groove for holding said screening-member on said roller.

In testimony whereof I affix my signature in presence of witnesses.

CHARLES S. MOORE.

Witnesses:
MAUDE M. MOORE,
JOY E. DAY,
CHARLES W. LOVETT.